July 19, 1938.  W. C. WAGNER  2,123,977
CUMULATIVE DEMAND METER
Filed July 24, 1934    8 Sheets-Sheet 1

WITNESS:

INVENTOR
Walter C. Wagner
BY
Augustus B. Stoughton
ATTORNEY.

July 19, 1938.   W. C. WAGNER   2,123,977
CUMULATIVE DEMAND METER
Filed July 24, 1934   8 Sheets-Sheet 2
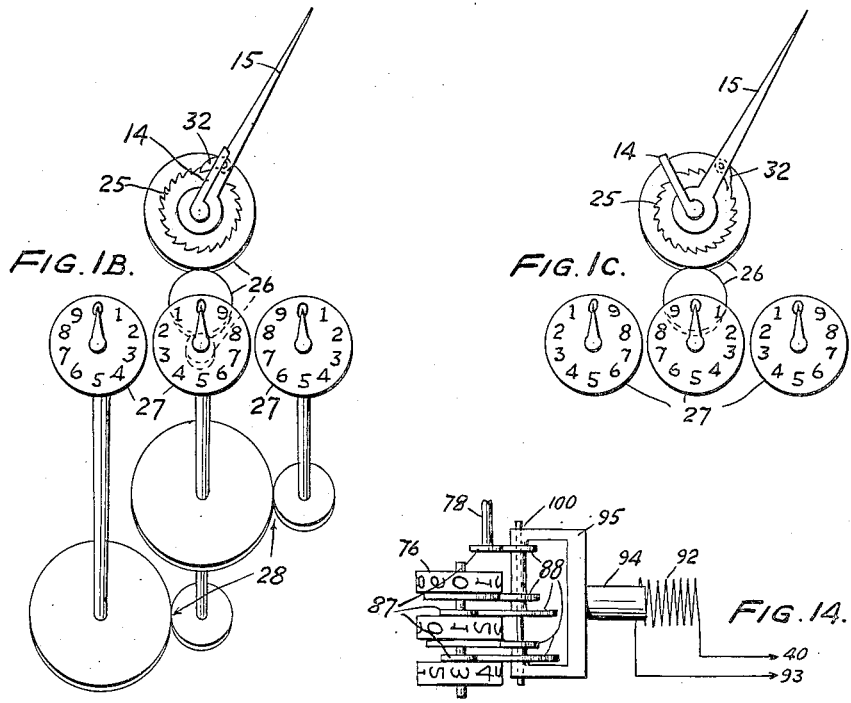
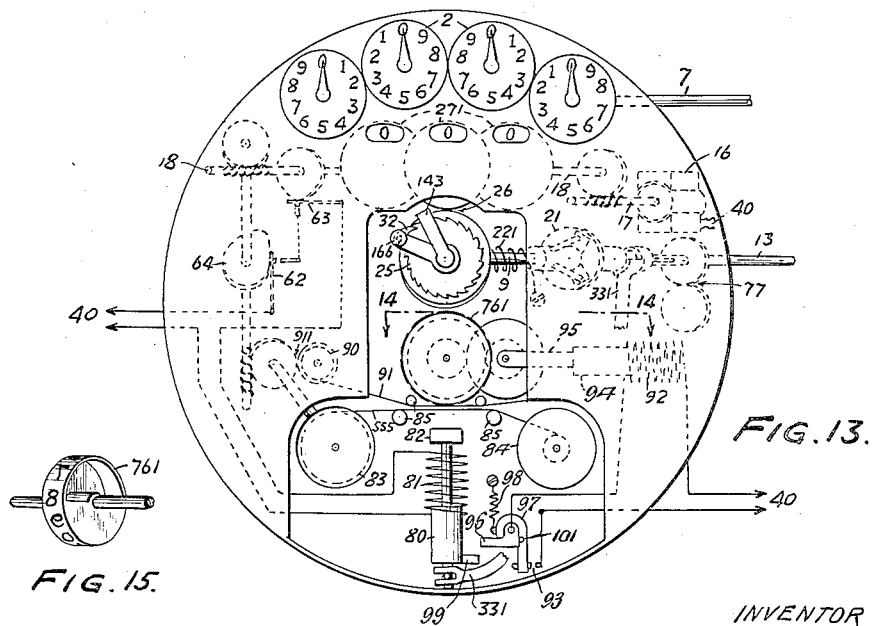
WITNESS:
INVENTOR
Walter C. Wagner
BY
Augustus B. Stoughton
ATTORNEY.

July 19, 1938.  W. C. WAGNER  2,123,977
CUMULATIVE DEMAND METER
Filed July 24, 1934  8 Sheets-Sheet 3

WITNESS:
Robt P Kitchel

INVENTOR
Walter C. Wagner
BY
Augustus B Stoughton
ATTORNEY.

July 19, 1938.  W. C. WAGNER  2,123,977
CUMULATIVE DEMAND METER
Filed July 24, 1934  8 Sheets-Sheet 4

WITNESS:

INVENTOR
Walter C. Wagner
BY
Augustus B. Stoughton
ATTORNEY.

July 19, 1938.　　　W. C. WAGNER　　　2,123,977
CUMULATIVE DEMAND METER
Filed July 24, 1934　　　8 Sheets-Sheet 6

WITNESS:
Rob R Kitchel.

INVENTOR
Walter C. Wagner
BY
Augustus B Stoughton
ATTORNEY.

July 19, 1938.  W. C. WAGNER  2,123,977
CUMULATIVE DEMAND METER
Filed July 24, 1934   8 Sheets-Sheet 7
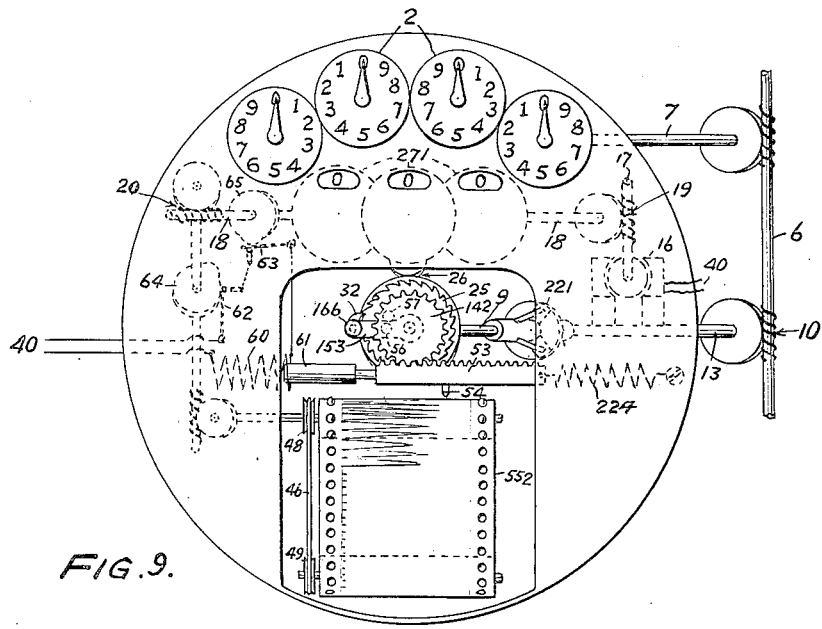
FIG. 9.
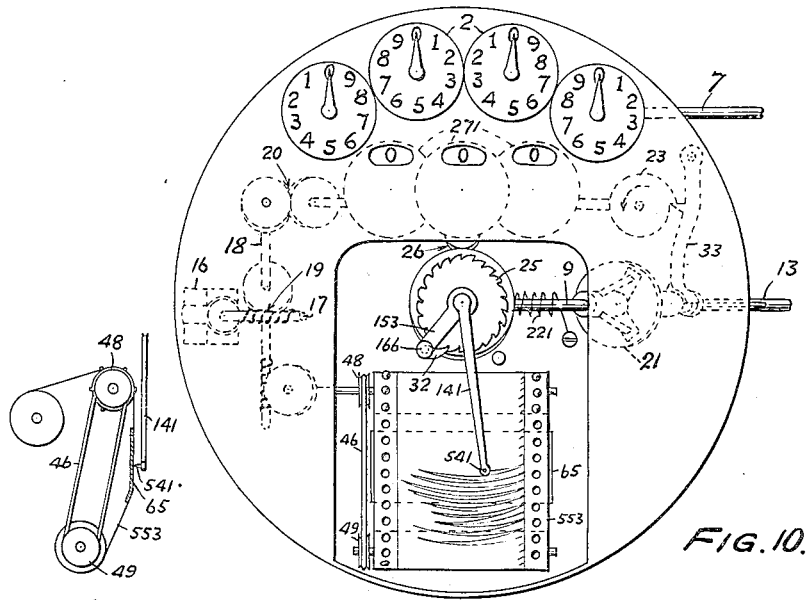
FIG. 10.
FIG. 10A.
WITNESS:
Rob't R. Mitchel
INVENTOR
Walter C. Wagner
BY
Augustus B. Stoughton
ATTORNEY.

July 19, 1938.  W. C. WAGNER  2,123,977
CUMULATIVE DEMAND METER
Filed July 24, 1934  8 Sheets-Sheet 8

WITNESS:
Rob R Kitchel

INVENTOR
Walter C. Wagner
BY
Augustus B. Stoughton
ATTORNEY.

Patented July 19, 1938

2,123,977

UNITED STATES PATENT OFFICE 2,123,977

CUMULATIVE DEMAND METER

Walter C. Wagner, Ardmore, Pa.

Application July 24, 1934, Serial No. 736,690

5 Claims. (Cl. 171—34)

This invention relates to improvements in maximum demand meters, including watthour demand registers and the indicating and graphic types of demand meters. One object of the present invention is to increase the reliability of maximum demand measurements in the simpler forms of demand meters and registers, making possible not only improved performance in the measurement of maximum demands in electric, gas, steam and other metering for which meters of this type are commonly used, but also permitting the extension of the use of the simpler forms of demand meters into fields which now require the use of more expensive demand measuring devices. The invention however, is equally applicable to demand meters of the latter classification, for which it permits a reduction in the time required to determine the maximum demand reading.

The application of my invention has made possible the development of a new combination which greatly simplifies the construction of demand meters and their application to metering installations, particularly in stations and for the customers of public utilities.

My invention will be described first in its simplest form in which it is applied to indicating electrical watthour demand meters and registers, after which its application to the graphic forms, together with the new "graphic" cumulative demand registers and printing maximum demand registers will also be described.

The conventional arrangement for the indicating type of maximum demand meter has certain disadvantages, the most important of which are errors in reading due to parallax, and to the complete obliteration of the reading after the meter has been reset. For this reason such maximum demand meters are a prolific cause of disagreements between customers and the utility companies which supply them.

The invention forming the subject matter of this application causes the resetting of the meter to add the reading for the maximum demand to the reading of a dial or dials provided for the purpose. At each succeeding reading period when the meter is reset, the reading is added to the preceding reading of these dials, and hence the reading used for billing purposes represents the difference between the present and preceding reading.

By this arrangement, any error in the reading for one period is automatically compensated in the reading for the succeeding period. Also, in the event of disputes in regard to the alleged maximum demand indication for a preceding period, a definite check of the reading for that period is possible by reference to the pointer up to the time that the dial is again advanced by resetting the meter at the following reading period.

The present invention is applicable to watthour-demand meters which combine the kilowatthour registration with the maximum demand indication, and to indicating demand meters which show a reading of maximum demand but do not include the measurement of kilowatt-hours in the same meter. Another advantage of my invention consists of discouraging attempts on the part of unscrupulous consumers to attempt to reduce the maximum demand indication. Any complete or partial motion in returning the pointer to zero results in increasing the reading of the "cumulative dial", and hence each successive attempt to do this will increase the accumulated reading of the cumulative dial at the time of the next reading at the end of the billing period.

The indicating watt hour-demand register is well known in the metering art, and no originality is claimed in regard to the maximum demand indicating device, except in combination with the cumulative dial feature which is described in detail.

In the following descriptions reference will be made to the following schematic and diagrammatic drawings forming part hereof and in which Fig. 1 shows a typical indicating maximum-demand register with the conventional maximum demand pointer and the cumulative maximum demand recording mechanism in accordance with my invention.

Fig. 1A is a side view showing a resetting device which is applicable to the construction shown in Fig. 1.

Fig. 1B, Sheet 8, shows in detail a cumulative mechanism in which the resetting of the pointer causes the demand to be registered on the cumulative dials.

Fig. 1C, Sheet 8, shows in detail an alternative construction in which the cumulative dials are actuated by the meter, and resetting of the pointer causes it to be placed in position for actuating the cumulative dials in accordance with the demand of the succeeding period.

Fig. 9 shows a structural variation of the graphic cumulative watthour-demand register, including a torque device for reducing the mechanical load, which is driven by the meter element.

Fig. 10 shows a structural variation of Fig. 8, and represents a somewhat simpler construction of the graphic demand mechanism within the register of the meter.

Fig. 10A is a side view of the chart mechanism shown in Fig. 10.

Fig. 13 shows a printing type of demand meter in which the printed record shows the individual period demands, together with the cumulative dial for giving the maximum demand reading.

Fig. 14 shows a detail on the line 14—14 in Fig. 13 and

Fig. 15 is a perspective view of one of the type wheels.

Figures 1, 1A:
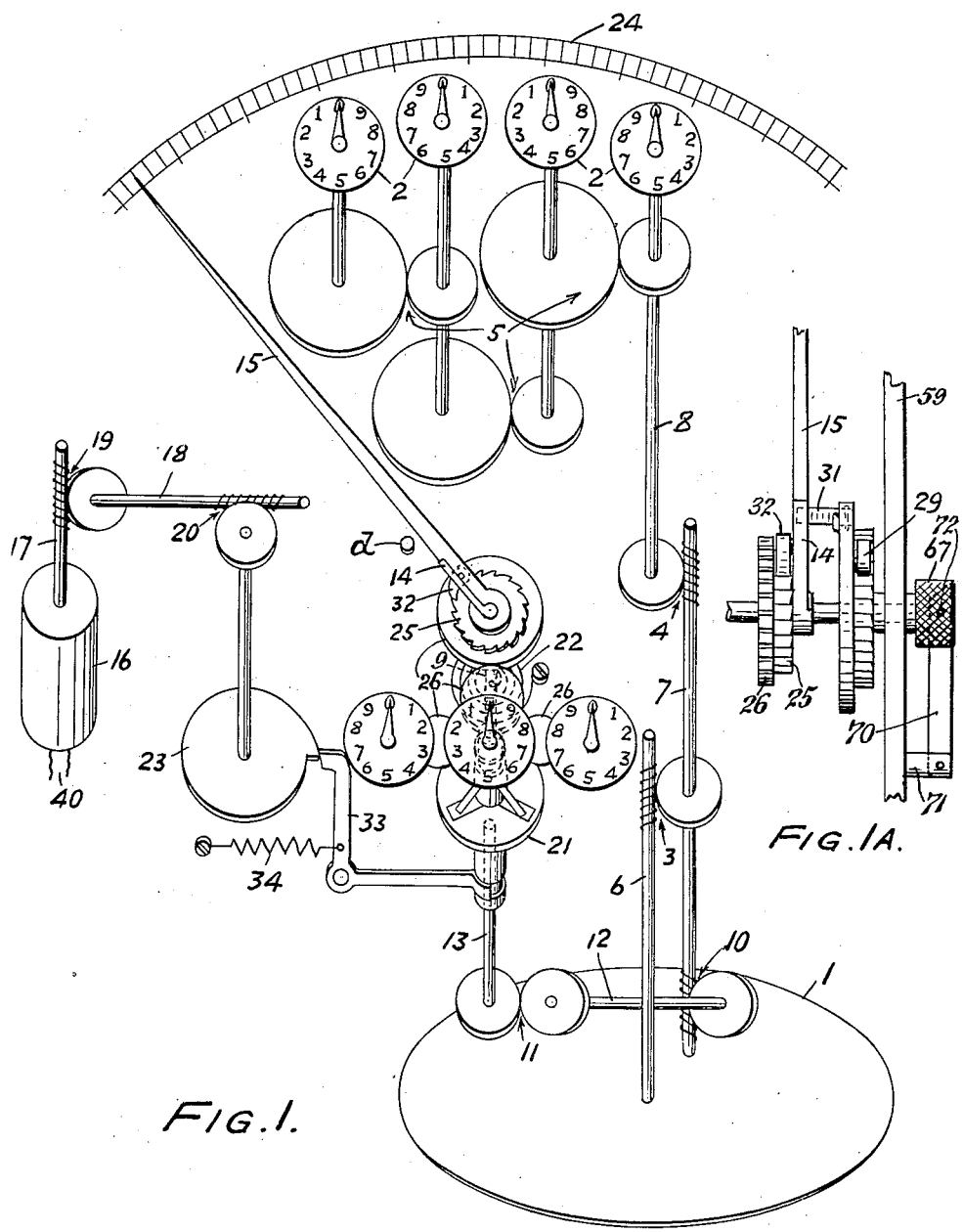

In Fig. 1 a conventional watthour meter disk 1 drives the well known watthour meter dials 2 through suitable gearing 3, 4 and 5 and shafts 6, 7 and 8. At the same time disk 1, through gearing 3, 10 and 11, and shafts 6, 7, 12, 13 and 9 drives dog 14 against friction pointer 15. Timing motor 16 through shafts 17 and 18 and gears 19 and 20 operates cam 23 which controls the periodic release of clutch 21 between shafts 13 and 9, by means of lever 33 and return spring 34. This causes dog 14 and shaft 9 to be returned to the starting position by spring 22. The forward movement of dog 14 pushes friction pointer 15 over scale 24, and pointer 15 remains at the highest reading to which it has been driven during any of the regular periods as controlled by timing motor 16. Pointer 15 therefore, serves to indicate the maximum load which has passed through the meter during the demand interval for which the meter is designed from the ratio of gearing 19 and 20. This part of the description is common in principle to all types of indicating watthour-demand registers and no originality is claimed for it and the multiplicity of possible structural variations except in combination with the cumulative device to be described.

Attached to pointer 15 is ratchet drive 32 which drives ratchet wheel 25, (indicated in Fig. 1 and shown in Fig. 1B, Sheet 8) and suitable gearing 26, cumulative dials 27, and their ratio gears 28.

Fig. 1C, Sheet 8, shows an alternative construction, in which the forward motion of pointer 15 drives ratchet wheel 25 through ratchet 32, and cumulative dials 27 through gearing 26 and 28. When pointer 15 is reset to zero, ratchet 32 is released, causing it to assume a new position in relation to ratchet wheel 25, thus again permitting pointer 15 to drive cumulative dials 27 to the position of maximum demand for the succeeding period. In general the construction of Fig. 1B is preferred because it imposes no additional mechanical load on the meter element, thereby eliminating possible inaccuracies in the measurement of kilowatt-hours, particularly during periods of light load.

Another structural variation of the principle of operation, consists of a ball clutch in place of ratchet 32 and ratchet wheel 25. This construction is illustrated at 255 in Fig. 7. It is obvious that this arrangement may be used interchangeably with the ratchet arrangement shown in the other figures.

The conventional demand register is reset to zero at the end of the billing period by an externally operated sealable resetting device in the meter cover. This permits friction pointer 15 to be reset to zero. Referring to Fig. 1A, the finger piece 67 on the outside of the cover operates the resetting pusher through a ratchet device 29, so that it can turn the pusher in one direction only, and the pusher 31 is yieldingly mounted so that it can pass the pointer 15 when the latter reaches its stop $d$. A similar device is illustrated in Fig. 8A. They differ from the conventional reset in that a ratchet drive is added. This prevents partial resetting which would result in incorrect indication of the cumulative dials. For use with the cumulative dial, it is possible also to adapt the resetting device so as to require several turns of the resetting lever or hand piece for one revolution of the resetting pusher. This is accomplished by inserting gears of the desired ratio between the lever and pusher.

It will be apparent to those skilled in the art that variations in design and construction of the individual parts may be made without departing from the principle and spirit of this invention, which broadly includes means for accumulating successive maximum demand readings on dials or counters.

Figure 2:
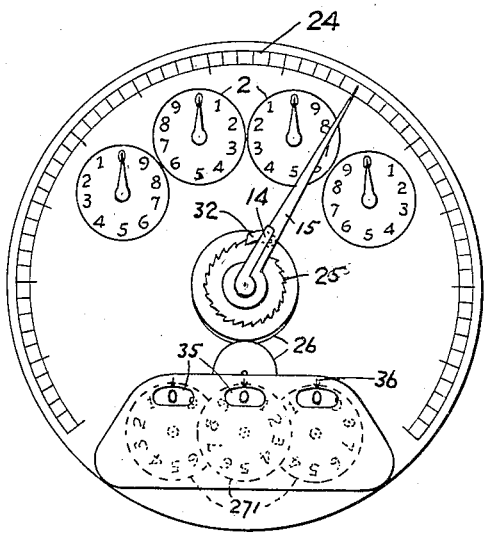
Fig. 2 shows the face of a watthour-demand register in which the cumulative recording dials are distinguished by having their numerals inscribed on circular disks, and the register face serves as a suitable mask to facilitate reading.

In Fig. 2 the design of the cumulative dials has been changed by having the numerals indicated on disks 271, which rotate when the demand mechanism is reset. The reading is obtained through openings 35 in the register face. This arrangement together with arrows 36, facilitates the reading of the cumulative dials 271 and serves also to distinguish these dials from meter dials 2 which give the energy consumption. If desired however, meter dials 2 may be of similar construction to the cumulative dials shown at 271.

Figure 3:
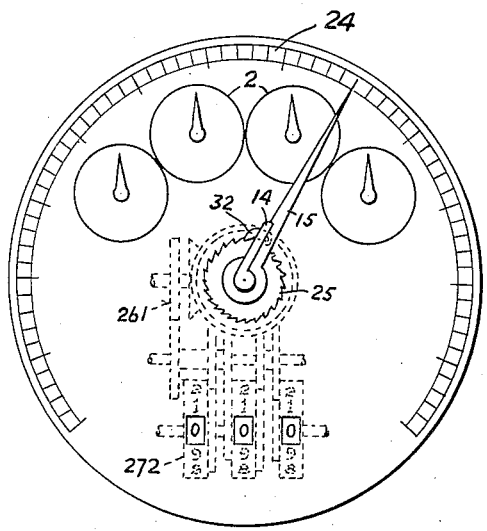
Fig. 3 shows the face of a watthour-demand register in which the cumulative recording dials are of typical cyclometer construction.

In Fig. 3 the design of the cumulative dials 272 includes the cyclometer design which is well known to the art, and commonly used in counters of various kinds. It differs only to the extent of the required detailed design for gearing 261. It is apparent that meter dials 2 may also be of the cyclometer type if desired.

Figure 4:
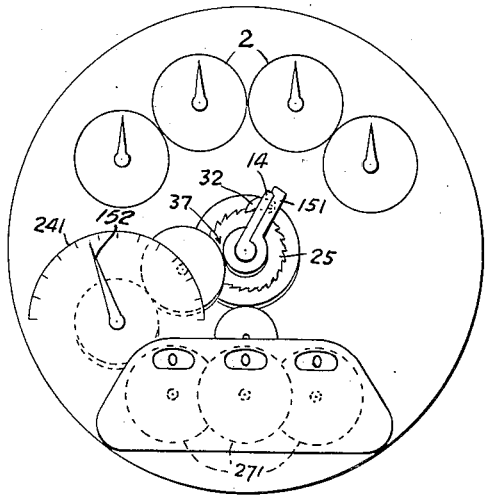
Fig. 4 shows the face of a watthour-demand register similar to Fig. 2 in which the traditional pointer and scale which are no longer essential to the use of the device have been retained in a smaller form to show an approximate indication of the maximum demand reading.

With the cumulative dial, scale 24 and pointer 15 are no longer required for obtaining an accurate demand reading, but may be of value in giving an approximate but immediate indication of maximum demand. It is possible therefore to make these accessories less prominent than in the conventional type of demand register. Such an arrangement is shown in Fig. 4 in which friction lever 151 does not move over a scale, but through gearing 37, drives pointer 152 which moves over scale 241.

Figure 5:
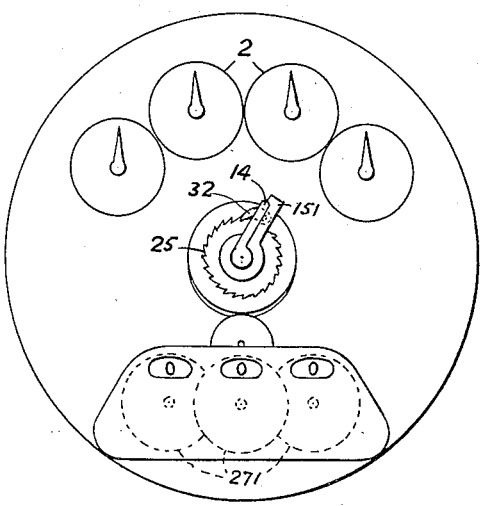
Fig. 5 shows the face of a similar watthour-demand register in which the traditional pointer and scale have been entirely eliminated. The cumulative dials indicate the sum of maximum demands in successive reading periods.

Fig. 5 shows the entire elimination of the demand scale and its associated pointer.

Figure 6:
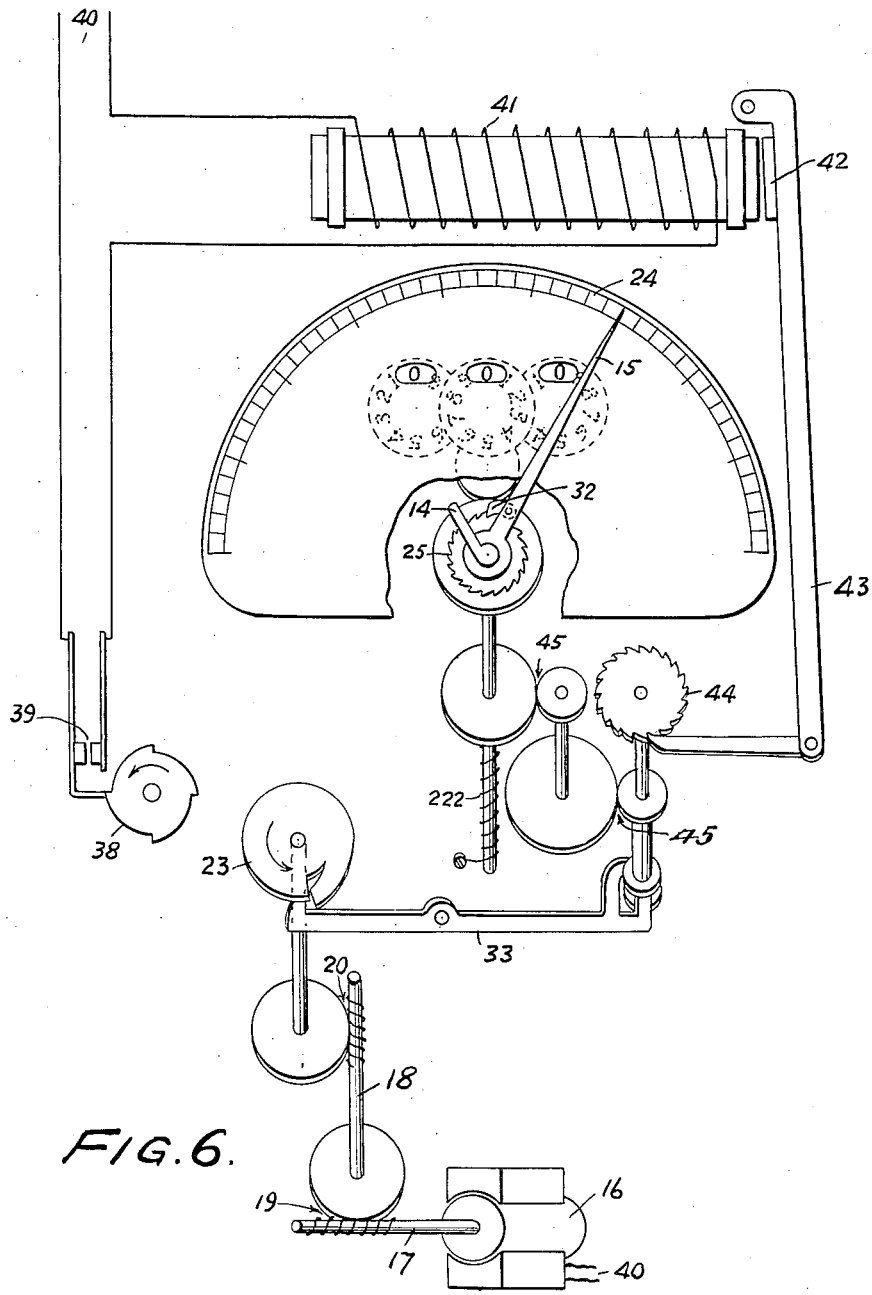
Fig. 6 shows a typical indicating demand meter with the cumulative feature similar to Fig. 2.
Figure 7:
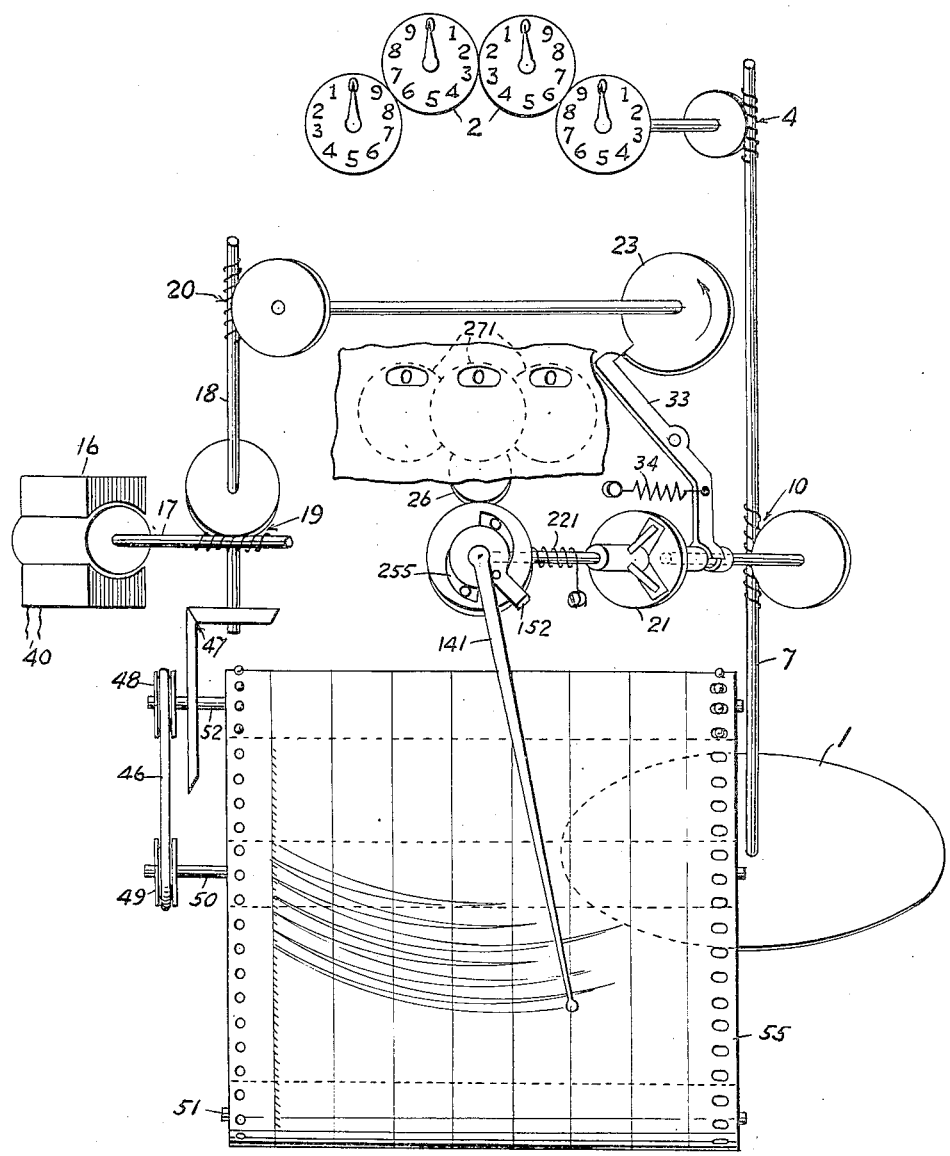
Fig. 7 shows a typical graphic watthour-demand meter to which the cumulative feature has been applied.

Fig. 6 shows a typical indicating demand meter. The demand meter is controlled by cam 38 and contact 39 within the watthour meter. Contact 39 closes a circuit from source 40 to operating coil 41 which attracts armature 42, and through lever and dog arrangement 43 actuates ratchet wheel 44 which, through suitable gearing 45 causes dog 14 to advance and to push friction pointer 15 over scale 24. Timing motor 16 through gearing 19 and 20 and shafts 17 and 18 operates cam 23, which in turn causes lever 33 to demesh gears 45 at desired intervals. It is apparent that an arrangement similar to clutch 21 in Fig. 1 is interchangeable with the sliding gear arrangement of Fig. 6. No originality is claimed for this part of the mechanism which is typical of indicating demand meters in common use to-day. The cumulative dial arrangement as described in detail for Fig. 1 is arranged to operate by the resetting of pointer 15, and the operation of the cumulative feature is entirely in accord with the preceding description. It is evident also that the structural variations in regard to the detailed method of operation, as for example in Fig. 1C, the different forms of dial faces of Figs. 1 to 5, and the ball clutch of Fig. 7, are all equally applicable to indicating demand meters.

For use with customers of large energy requirements, graphic or printing demand meters are generally used by utilities for determining the maximum demand for billing purposes and to record the characteristics of the load. The routine inspection of some types of charts for finding the maximum demand requires considerable time, and a saving in time results by combining the cumulative feature with the graphic demand mechanism. The maximum demand reading will then be equally reliable, and may be even more accurate than one obtained by an inspection of the chart. Fig. 7 shows a graphic demand meter equipped with a cumulative dial. No originality is claimed for the graphic demand meter except in combination with the cumulative dial.

While some graphic demand meters are used on services for which it is necessary to determine the demand for every demand interval, in the great majority of cases only the maximum demand is required to be of the requisite accuracy for billing purposes. The remainder of the record serves only as an index to the general load requirements. Since the cumulative dial provides an accurate reading of the maximum demand, it is possible to so simplify and reduce in size graphic and printing demand mechanisms that they may be constructed as a part of the meter register, instead of requiring a graphic watthour-demand meter of distinctly different design from that used when no demand measurement is required. It becomes possible therefore to produce a graphic cumulative watthour demand register which may be applied in place of the regular watthour register. With my invention therefore, it becomes possible to replace the ordinary register of an installed meter with one which provides a cumulative dial for the maximum demand reading, and also a graphic or printed record of other demands, as compared with the entire replacement of the meter or the use of a separate demand meter, which is necessary with equipment which has been available heretofore.

Figure 8:
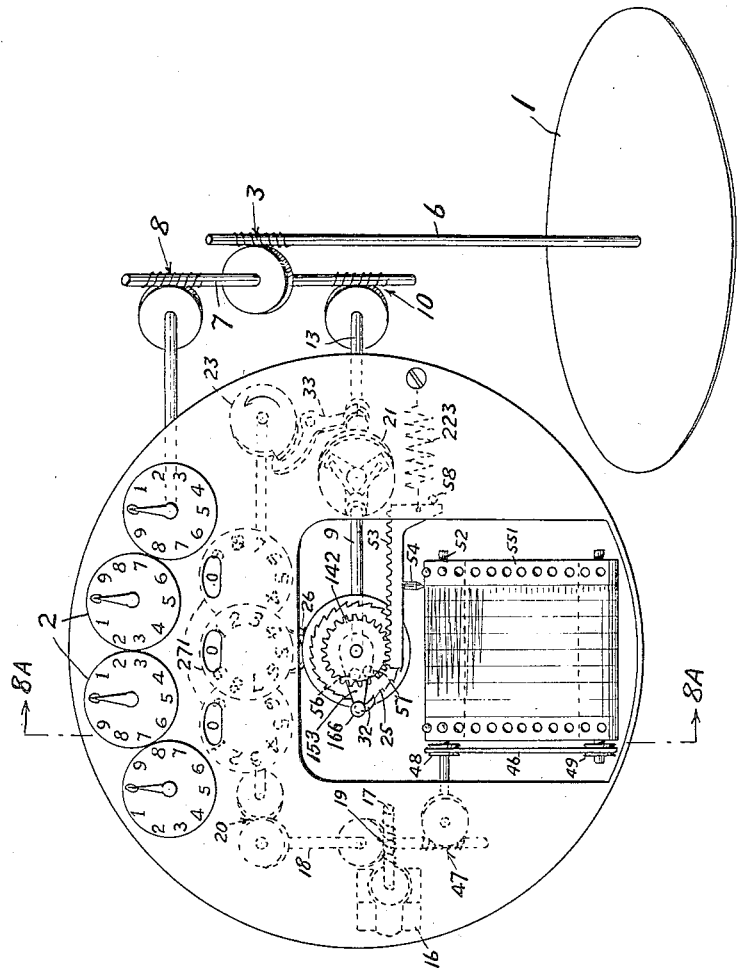
Fig. 8 shows the new combination of a simplified graphic demand indicating mechanism and a cumulative demand mechanism within the register of a meter.
Figure 8A:
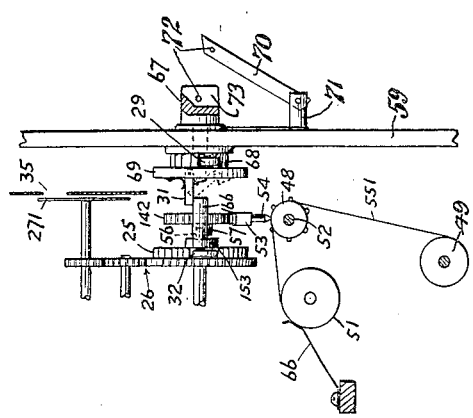
Fig. 8A is a sectional view taken on the line 8A—8A of Fig. 8.

Fig. 8 shows such an arrangement developed along the general lines of the watthour-demand registers of Figs. 1 to 5 inclusive; and this arrangement utilizes various parts of the demand register mechanism in conjunction with the graphic chart equipment which is included within the register.

The cumulative register is similar to that described in detail in Fig. 1 except that it is actuated from arm or lever 153 instead of from pusher pointer 15. Attached to shaft 9 is pinion gear 142 which engages rack 53, which in turn carries stylus 54. Timing motor 16 through suitable gearing 47 drives the chart control bobbin 52. The latter is designed to drive perforated chart 551 at the desired constant speed. Bobbin 52, through suitable means, as a belt and pulley arrangement 48 and 46, drives also re-roll 49. Chart 551 is prevented from unrolling too rapidly by retaining spring 66 on chart supply spool 51.

In operation, pinion gear 142 resets at the end of every demand interval by the operation of clutch 21 and spring 223 which pulls rack 53 against stop 58 and returns stylus 54 to the zero position. It is evident that the amount of motion of the stylus during each demand interval depends upon the energy supplied during that demand interval, and with the chart moving at constant speed a record similar to that shown on chart 551 is produced. Pin 57 on gear 142 pushes pin 56 on friction lever 153, whose position at the end of a given period will correspond to the maximum motion of gear 142 in any demand interval during the period. Friction lever 153 controls cumulative dials 271, through ratchet wheel 25 and gearing 26. Resetting of the cumulative dials is accomplished by returning pin 166 on friction lever 153 to the zero position. This may be done by hand or through hand operated means to be presently described. This motion of friction lever 153 through pins 56 and 57 also actuates gear 142, which is permitted to move by the slipping of clutch 21, and returns rack 53 and stylus 54 to the zero position. In the graphic registers it is not necessary to provide for resetting of the cumulative dials from the outside of the meter cover, which is removed for changing the chart. If desired however such means may be provided, and are shown in detail in section in Fig. 8A.

The resetting device in the meter cover as shown in Fig. 8A is applicable to the forms of cumulative dials as shown in Figs. 1 to 13 inclusive. It differs from that used in ordinary watthour demand meters in that a ratchet 29 is provided whereby the motion of the resetting pusher is limited to the direction required for resetting. This effectively prevents the resetting device from being operated so as to produce a fictitious reading. In resetting, knurled knob 67 outside of meter cover 59 operates ratchet wheel 68 and ratchet pawl 29 attached to disk 69, which carries resetting lever 31. The latter is pivoted and is held in its normal position against a stop by a spring, which permits it to assume the position shown dotted when pin 166 has reached the limit of its travel at the zero position and in that zero position the resetting lever 31 passes the pin 166. Knurled knob 67 is slotted to receive latch 70, which is hinged to stud 71 which is mounted in a fixed position on cover 59. In the position for normal meter operation latch 70 is closed and fits into slot 73 in knurled knob 67, with a seal applied through sealing hole 72. It is apparent that the latch cannot be closed and seal applied except when knob 67 is in the position where the resetting operation has been completed. To operate, the reset latch 70 is opened and knurled knob 67 is turned through a complete revolution, when latch 70 may again be closed. It is possible also to provide for a resetting operation of several revolutions of knob 67 by interposing ratio gears between knob 67 and disk 69. The spirit and principle of this invention includes all means of resetting a demand meter by means of a reset capable of operation in one direction only, and of making it mandatory to complete the resetting operation before the reset device may be resealed. It is apparent that many detailed variations may be made in the mechanical arrangement, ratchet 29 may be a ball clutch, and disk 69 may consist of other suitable means for carrying resetting lever 31, as shown in Fig. 7.

In the design of Fig. 8 the operation of the demand mechanism may introduce an appreciable burden in relation to the available torque of the watthour meter. A development which overcomes this objection is shown in Fig. 9. Here the motion of gear 142 is transmitted to rack 53 to which is attached spring 224 which tends to pull rack 53 and stylus 54 toward the full-scale position, but is permitted to do so only in so far as worm drive 10 will permit gear 142 to turn. Resetting of stylus 54 to zero at the end of every demand interval is accomplished by the operation of solenoid 60 acting on core 61 which moves rack 53 against the action of spring 224, and slip clutch 221, through gear 142 and shaft 9. Solenoid 60 is operated by contacts 62 and 63 operated by the timing cams 64 and 65. The operation of the cumulative dials is the same as for Fig. 8, except that the resetting motion is opposite in direction by the reversal of ratchet 32. This permits the zero position of stylus 54 to be on the left hand side of the chart.

Fig. 10 shows a simplified construction in the driving member for the stylus over the chart. Stylus arm 141 is attached to shaft 9 and carries stylus 541 which moves over chart 553 in the form of an arc. Its motion also pushes friction lever 153 by means of stud 166. The cumulative dial, general re-roll, and chart arrangements of Fig. 8 are applicable, except that a flat surface 65 in Fig. 10A is provided to serve as a base against which stylus 541 may mark chart 553.

Figure 11:
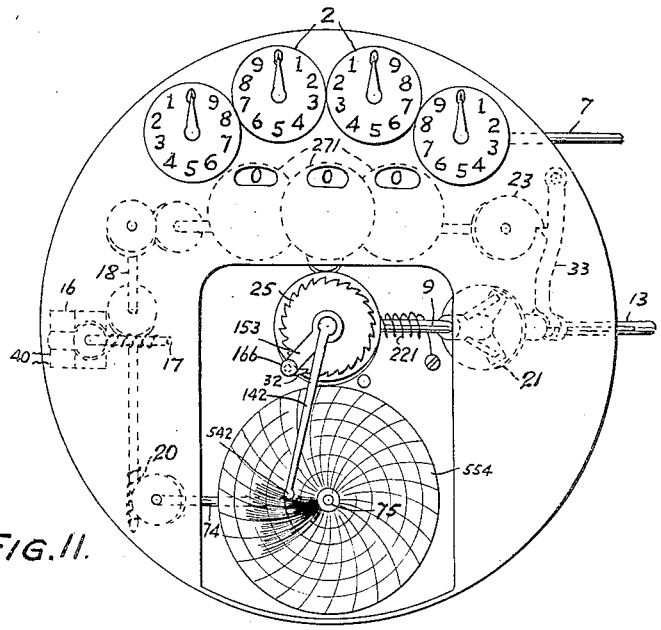
Fig. 11 shows a graphic cumulative watthour-demand meter with a circular chart mounted on the register face.

Fig. 11 shows the application of a circular chart to the cumulative watthour-demand register face. Timing motor 16 drives shaft 74 through gearing 20, and chart 554 is attached to a disk at the end of shaft 74 by knurled knob 75, so that chart 554 will rotate in accordance with elapsed time. Stylus arm 142 is attached to shaft 9, either directly or through suitable gear reduction, and hence the relative motion of stylus 542 and chart 554 will result in a chart similar to that indicated in Fig. 11.

Figures 12, 12A:
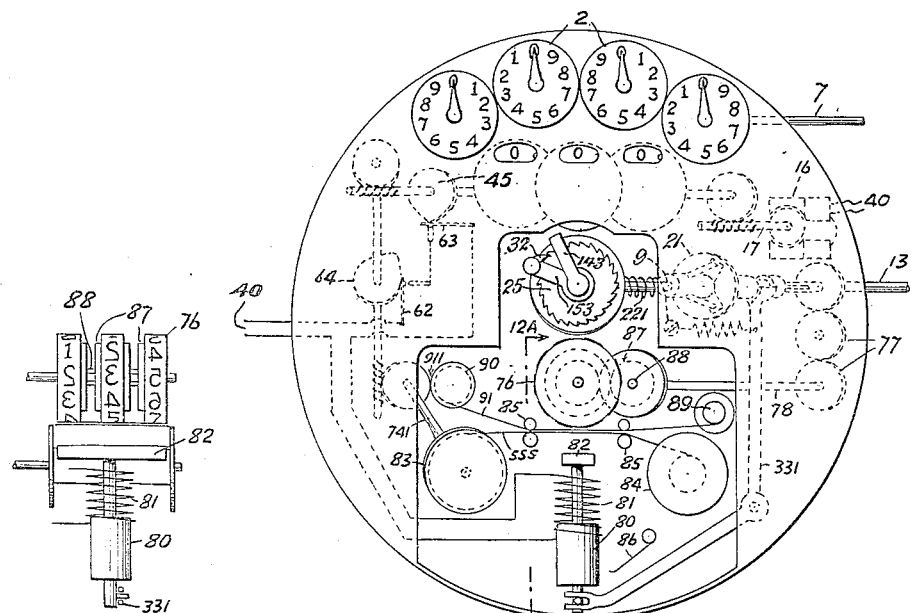
Fig. 12 shows the combination of a cumulative printing demand meter with a cumulative dial for indicating the maximum demand.
Fig. 12A shows a detail on the line 12A—12A of Fig. 12.

Further applications are possible with the cumulative register by applying a printing arrangement and tape instead of the graphic chart. Fig. 12 shows this arrangement. Printing dies 76 are driven from shaft 13 through shafts 78 and 88 and gears 77 and 87. Since shaft 13 is geared to the watthour meter element the rotation of dies 76 is a measure of the energy consumption. At desired time intervals cams 45 and 64 close contacts 63 and 62, thus energizing solenoid 81 from source 40 for a definite period of short duration. Solenoid 81 attracts its core 80, which carries platen 82 and presses paper tape 555 and inking ribbon 91 against the numerals on the periphery of printing dies 76 thus printing a number on paper tape 555. Paper tape 555 and inking ribbon 91 are moved at constant speed by spools 83 and 90, which are being driven by timing motor 16 through gearing 911 and 20, and shafts 741, 18 and 17. Guides 85 retain the paper and inking tapes in their proper positions as they are gradually unrolled from their retaining spools 84 and 89. The numerals printed on the paper tape are cumulative, and the demands of successive demand intervals are obtained by subtracting successive readings.

At the same time shaft 13 also drives pusher lever 143 through shaft 9 and clutch 21, and the cumulative dial mechanism, which has been described previously, provides for obtaining the maximum demand reading. A variant in design of the clutch release is incorporated in Fig. 12, in that the periodic release of the clutch 21 is accomplished by solenoid 81 by means of core 80 to which resetting lever 331 is attached. In order to obtain a sharp impression of the numerals on the tape, platen 82 is arranged so that actual printing is accomplished by the momentum of platen 82 and core 80, Fig. 12A, thus permitting platen 82 to move back slightly after the initial impulse of coil 81. The return of the platen is facilitated by spring 86.

In Fig. 13, provision is made for the return of the printing dies to the zero position at the end of each demand interval. The printed record on the tape, therefore, shows the individual demands without the necessity for a subtraction. This is accomplished by demeshing gears 88 on shaft 100 from gears 87 at the end of every demand interval, after the printing operation is completed. The return to zero of the printing dies may be accomplished by means of a heart-shaped cam, well known to the art and commonly used in rotating standards as a means of zero reset; or by weighting the printing dies 761, Fig. 15 so that when they are free to move they will return to the zero position. In the design shown, shaft 100 is carried in frame 95 attached to core 94 of solenoid 92, whose operation is controlled by contact 93, which is closed by the return motion of core 80 of solenoid 81. Contact 93 is normally held in the open position by spring 98, and the movable arm of contact 93 carries lever 96, which is shown in the normal inoperative position. At the end of every demand interval when core 80 moves upward, projection 99 strikes lever 96, which is free to move to permit projection 99 to pass on its upward stroke. On the return stroke, however, projection 99 strikes lever 96, and by means of stop 101 and movable contact arm 97 closes contact 93, thus energizing coil 92 and permitting the printing dies to reset.

Many variations in detailed design and construction features are possible to accomplish the results desired which are new to the metering art and which represent the spirit and intent of my invention. While the description has covered in detail the application of the principles involved to electric meters, it is apparent that they are equally applicable to meters designed for the measurement of gas, water, steam or condensate by merely driving shafts 7 and 13 from the rotating member of the respective meters and providing electrical source 40 for operating timing motor 16 and the electrical printing or reset arrangements in Figs. 9, 12, and 13. It is apparent also that in all cases timing motor 16 may be a spring motor in which case electrical source 40 is not required for Figs. 1 to 5, 7, 8, 10 and 11.

The designs shown in Figs. 12 and 13 have a further application in that the printing mechanism may be arranged to provide successive readings at much longer intervals than the usual demand intervals of from 5 to 60 minutes. It is evident that with suitable additional reduction gearing for shaft 17 successive readings may be at intervals of a day, week or month if desired, in which case the printed tape will give the energy consumption during such periods. The cumulative demand feature is not necessary for this purpose, but can be applied if the reading of maximum demand is also desired.

It will be obvious to those skilled in the art that modifications may be made in details of construction and arrangement without departing from the spirit of the invention which is not limited in respect to such matters or otherwise than the prior art and the appended claims may require.

I claim:

1. In a meter, a case, a pointer lever, a reset device comprising a pusher, means whereby said pusher may yieldingly contact and pass the pointer lever in its zero position, means whereby said pusher may be operated in one direction only, manual means for operating said pusher from the outside of the case, and means for sealing said external operating means.

2. In a meter, a case surrounding and enclosing the operating elements of said meter, a pointer lever, a reset device comprising a pusher, means whereby said pusher may yieldingly contact and pass the pointer lever in its zero position, means whereby said pusher may be operated in one direction only, and manual means for operating said pusher from the outside of the case.

3. In a removable register for a watthour demand meter, means for indicating cumulatively the maximum demand made in each of a number of successive periods, and means for indicating the successive demand readings on a chart arranged within the removable register.

4. An electric demand meter including a pusher element for indicating independently the demand in successive periods, means for causing a return of said pusher element at the end of each such period, a sweephand operated by said pusher element to the point of its greatest movement, a reset lever, the operation of which is necessary for setting back said sweephand to zero, an integrator operated by said sweephand in its setting back movement to indicate the extent of said movement, means for sealing said reset lever in an inactive position, means for preventing the movement of said lever except in the re-setting direction, and means for releasing said reset lever from said sweephand when said sweephand reaches the zero posittion.

5. An electric demand meter including a pusher element for indicating independently the demand in successive periods, means for causing a return of said pusher element at the end of each such period, a sweephand operated by said pusher element to the point of its greatest movement, a reset lever, the operation of which is necessary for setting back said sweephand to zero, an integrator operated by said sweephand in its setting back movement to indicate the extent of said movement, means for preventing the movement of said lever except in the re-setting direction, and means for releasing said reset lever from said sweephand when said sweephand reaches the zero position.

WALTER C. WAGNER.